April 28, 1953 — E. D. SMYSER — 2,636,478
FLUID FLOW MEASURING DEVICE
Filed June 21, 1948 — 2 SHEETS—SHEET 1

INVENTOR
ELMER D. SMYSER
BY
ATTORNEY

April 28, 1953     E. D. SMYSER     2,636,478
FLUID FLOW MEASURING DEVICE
Filed June 21, 1948     2 SHEETS—SHEET 2
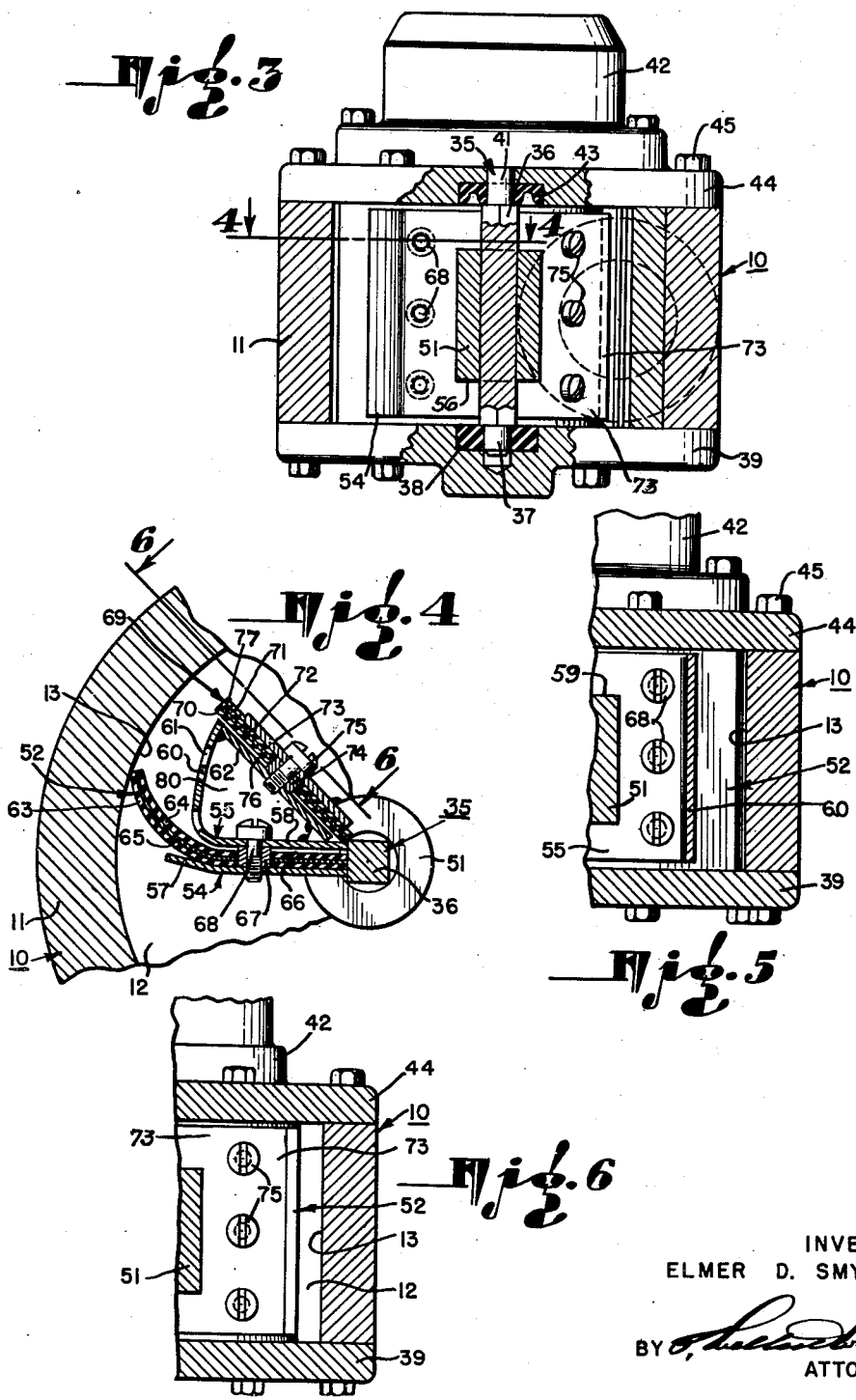
INVENTOR
ELMER D. SMYSER
ATTORNEY Patented Apr. 28, 1953

2,636,478

UNITED STATES PATENT OFFICE 2,636,478

FLUID FLOW MEASURING DEVICE

Elmer D. Smyser, Bakersfield, Calif., assignor of one-half to F. C. Ripley, Sr., Los Angeles, Calif.

Application June 21, 1948, Serial No. 34,287

12 Claims. (Cl. 121—67)

1

This invention relates generally to fluid metering devices, and relates more particularly to flow meters for indicating the volume of flow through a conduit or pipe.

In many oil fields, a plurality of oil wells are connected together so as to discharge into a common tank or into a conduit common to all of the wells. The total production of all of the wells, so connected together, can be adequately measured in the tank, but it is desirable to have a metering device for indicating the production of each well.

It is therefore an object of the present invention to provide a flow meter which will indicate with reasonable accuracy the volume of flow of a well.

It is another object of the invention to provide a flow meter of the rotary type wherein the rotor carries a plurality of flexible sealing blades.

Still another object of the invention is to provide a device of this character wherein at all times there is a plurality of such sealing blades in effective sealing relationship with the wall of the stator in the line of flow between the inlet and outlet.

Still another object of the invention is to provide a device of this character wherein the blades may flex to permit a blow-by should the pressure of the oil from the well exceed a predetermined value. Thus, a safety factor is provided by the device.

A still further object of the invention is to provide a device of this character wherein the sealing blades are of rubber or a rubber like material, and wherein clearance is provided for the blades should said blades swell.

Another object of the invention is to provide a device of this character having means for producing differential pressure on opposite sides of the hub or shaft, between the inlet and outlet.

Still another object of the invention is to provide a device of this character that is self-cleaning, and wherein friction is reduced to a minimum.

Further objects of the invention are to provide a device that is simple in construction, that is light in weight and that is effective in operation.

Other objects and advantages of the invention will appear from the following part of the specification.

Referring to the drawings which are for illustrative purposes only:

Fig. 1 is a side view of a device embodying the present invention, said view being taken on line 1—1 of Fig. 2;

2

Fig. 3 is a sectional view of the device, taken on line 3—3 of Fig. 1;

Fig. 4 is an enlarged partial sectional view taken on line 4—4 of Fig. 3;

Fig. 5 is a partial section taken on line 5—5 of Fig. 1; and

Fig. 6 is a partial section taken on line 6—6 of Fig. 4.

Figure 1:
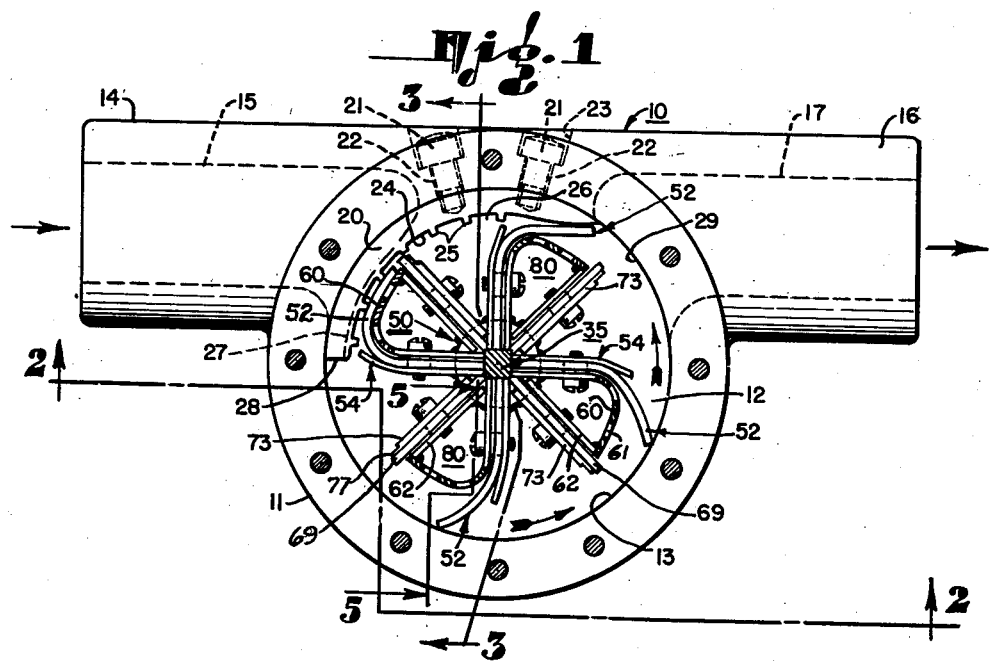
Figure 2:
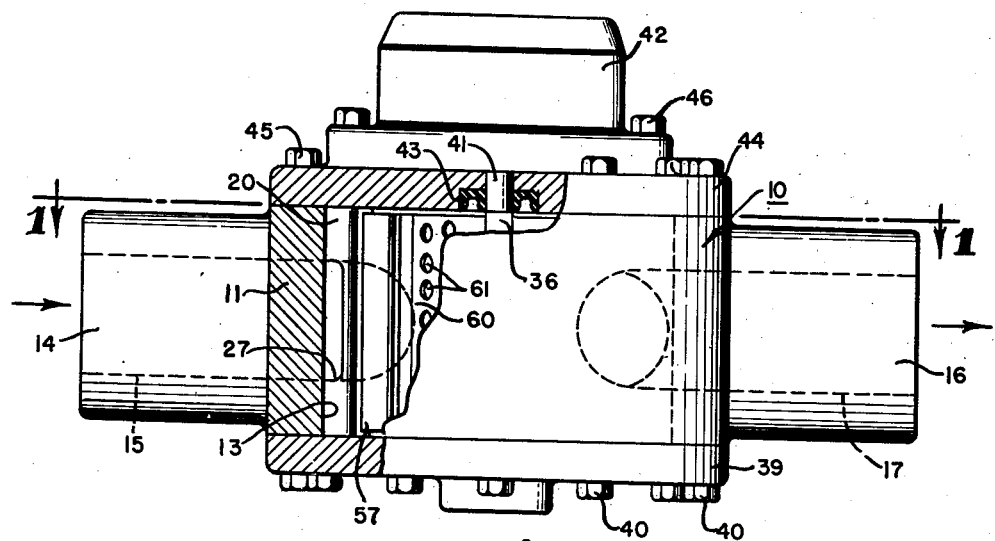
Fig. 2 is a sectional view taken on line 2—2 of Fig. 1.

Referring more particularly to the drawings, the device comprises a body, indicated generally at 10, having a cylindrical part, indicated generally at 11, which may be termed the stator. Within the stator is a cylindrical chamber 12 defined by a cylindrical wall 13. The body 10 also includes an inlet 14 having an inlet passage 15 which may be internally threaded for connection with a pipe line through which the fluid, such as oil, flows. There is also an outlet 16 having an outlet passage 17 which also may be internally threaded for connection with the pipe line. The inlet and outlet are arranged in axial alignment and are generally tangential to the stator.

Within the chamber 12 is an arcuate shaped member 20 having its outer radius the same as the radius of the chamber 12. The member 20 is secured within the chamber 12 by any suitable means, such as screws 21, received in openings 22, provided therefor in the body 10. It is to be noted that the openings 22 are enlarged at 23 for reception of the heads of the screws 21, so that said heads will not project beyond the outer surface of the body 10.

The curvature of the inner side 24 of the member 20 is on a shorter radius than the radius of the cylindrical chamber 12, and there is a plurality of arcuately spaced ridges or ribs 25 which project radially inwardly of the surface 24. The ribs 25 extend the entire width of the member 20 and the free ends of said ribs terminate in a plane having a radius of less length than the radius of the surface 24. Thus, a plurality of arcuately spaced pockets 26 are provided on the inner side of the member 20, said ribs 25 and pockets 26 being for a purpose to be hereinafter described.

The member 20 has a passage 27 therein, which communicates with the inlet passage 15 and has a discharge end 28 for discharging oil into the cylindrical chamber 12 generally tangentially thereto. The outlet passage 17 has an inlet 29 communicating with the cylindrical chamber 12 in substantial alignment with the inlet passage 15.

A shaft 35 is provided in axial relationship with the cylindrical chamber 12. The portion of the shaft extending within the chamber 12 is polygonal, and as shown is square in cross section, as indicated at 36. One end 37 of the shaft is round in cross section, and is mounted in a bearing 38 disposed in a recess provided therefor in a cover plate 39 attached to the stator by any suitable means such as screws 40. It is to be noted that the bearing 38 may be of any suitable material but is shown as being of a rubber composition of any well known character. The opposite end 41 of the shaft 35 is also round and is connected to a counting or recording mechanism indicated at 42. This counting mechanism may be of any suitable type of service to count the number of revolutions of the shaft, thus indicating the volume of oil that has flowed through the device. The end 41 of the shaft has a suitable seal 43 disposed thereabout and received in a recess provided therefor in a cover plate 44 which is also secured to the stator by means of screws 45. The counting or recording device 42 is secured to the cover plate 44 by means of screws 46.

Means for effecting rotation of the shaft 35 is provided and comprises a rotor, indicated generally at 50. The rotor comprises a short hub 51 having a bore therein which is square in cross section, for reception of the portion 36 of the shaft, so that rotation of the rotor will effect rotation of said shaft.

The hub carries a sealing blade supporting structure. There are a plurality of main blades, indicated generally at 52, four such blades being shown. The support means for each blade comprises a pair of plates 54 and 55 respectively. The plate 54 extends generally radially from the shaft 35 and is provided with a cut-away portion or notch 56 for reception of the hub 51, said plate being secured to the hub of any suitable means such as welding or the like. The plate 54 is of less length than the radius of the cylindrical chamber 12 and has an end portion 57 which is turned rearwardly with respect to the direction of rotation of the rotor which, as shown in Figs. 1 and 4, is counter-clockwise. The plate 55 includes a portion 58 which is substantially parallel to the plate 54 and in rearwardly spaced relation thereto with respect to the direction of rotation of the rotor. The plate 55 also includes a cut-away portion or notch 59, for reception of the hub 51, said plate also being welded to said hub. The plate 58 includes a rearwardly turned portion 60 having a plurality of holes 61 therein, the purpose of which will be hereinafter described. The rearward edge of the portion 60 is welded to the adjacent end of a plate 62 which extends in a generally radial direction from the shaft and is notched to receive said hub, said plate 62 being also welded to the hub.

Each of the main blades 52 may comprise a single sheet of resilient flexible material, such as rubber or any suitable rubber composition, but as shown each of said main blades comprises a plurality of said sheets indicated at 63 and 64 respectively. It has been found that superior results have been obtained by having a plurality of blade sheets or members. In some installations it has also been found desirable to provide a thin sheet of flexible resilient metal 65, between the sheets 63 and 64. The sheets comprising the blades are disposed in the space between the blades 54 and 55 and are longer than the radius of the chamber 12, so that the end portions of the blades curve rearwardly, with respect to the direction of rotation of the rotor, as best shown in Figs. 1 and 4. The thickness of the blades is less than the distance between the plates 54 and 55, so as to provide a space 66 for swelling of the blades should such swelling occur. The blades are provided with a plurality of openings therein which are spaced longitudinally apart with respect to the chamber 12, and in which are received spacers 67 of a length substantially the same as the width of the space between the plates 54 and 55. The plates 55 are provided with openings therein, in register with the openings in the blades for reception of screws 68 which are threadably received in tapped openings provided therefor in the plates 54. The screws 68 and spacers 67 retain the blades in position.

Auxiliary blades 69 are also provided, and as shown comprise a pair of blade members 70 and 71 with a sheet of metal 72 disposed therebetween. These blade members and the sheet of metal 72 may be of the same respective materials as the comparable parts of the main blades. The auxiliary blades are mounted between the plate 62 and a plate 73 in parallel spaced relation thereto. The plate 73 is also notched and secured to the hub 51. The auxiliary blades are of less length than the radius of the chamber 12 and are secured in position by means of spacers 74 and screws 75, there normally being a space 76 between the plate 62 and the adjacent surface of the blade member 70 to provide for expansion or swelling of the blades. It is to be noted that the blade 73 has a thin free end portion 77 which extends radially of the chamber 12 and is flexible.

It is to be noted that the portions of the inner ends of the plates 54 and 55 and the blades 52 between the respective ends of the hub and adjacent cover plates, engage the respective flat surfaces of the square portion 36 of the shaft 35. Similar portions of the auxiliary blades 69 also engage the shaft portion 36 adjacent the corner edges thereof, and similar portions of the plates 62 and 73 engage the adjacent sides of the plates 55 and 54 respectively. Hence, there will be no bypassing of fluid about the shaft. It is also to be noted that the plates of the rotor have their respective ends spaced somewhat from the cover plates 39 and 44, but that the ends of the blades 52 and 69 abut against the inner surfaces of said cover plates.

In operation, the oil from the well flows through the inlet passage 15 and is discharged tangentially at 28 to effect counter-clockwise rotation of the rotor. The pressure of the oil thus entering the cylindrical chamber 12 is exerted on the adjacent seal 52. The pressure on the upstream side of said seal also is exerted over substantially the entire face thereof and urges said seal against its supporting plate 54. As the rotor is rotated by the oil flowing into the chamber 12, downwardly and then upwardly to the outlet 29, said rotor turns in a counter-clockwise direction, as seen in Fig. 1. The rotor rotates in said counter-clockwise direction due to the fact that the member 20 forms a restriction on one side of the shaft so that there is a differential of pressure created on opposite sides of said shaft, and the oil entering the chamber 12 by way of the passage 27 and end 28 thereof, follows the path of least resistance. As each seal 52 passes the outlet 29, it will engage the adjacent end of the restricting member 20 and then it will engage the first of the ribs 25. The rib 25 will cause the free end of the seal 52 to fold toward the portion 60 of the plate 55, as best shown in Fig. 1, and as the rotor rotates further in the clockwise direction, the ribs 25 will cause the free end of said seal 52 to engage the outer surface of said portion 60, although it is to be understood that such free end of the seal does not necessarily have to engage said outer surface of said portion 60. It will be noted that when the seal is thus folded against the portion 60, it generally follows the curvature of the plate 55, said curvature being such as to prevent a sharp folding of the seal 52. Further, due to the relatively small areas of the ribs 25 engaging the seals or blades 52, friction therebetween is relatively small.

It is well known that wells producing oil having a considerable amount of paraffine therein do not have gravel in said oil, while wells in which the oil produced carries a considerable amount of gravel, has little paraffine.

When the present device is interposed in the pipe line of a well producing oil having a considerable amount of paraffine therein, such paraffine tends to collect on the parts of the device, and such paraffine collecting on the leading face of the seals 52, and particularly the free end portions thereof, is scraped off by the ribs 25 as said seals or blades move through the arc which is substantially coincidental with that of the member 20. The paraffine thus scraped off the blades or seals 52 tends to collect in the pockets 26 between the ribs. The paraffine which collects on the opposite face of the free end portions of the seals tends to work through the openings 61 into the chambers 80 defined by the plates 55 and 62. This paraffine is removed from the chambers 80 when the device is given its periodic cleaning. The accumulated paraffine in the chambers 80 is removed from the ends of said chambers.

It is to be noted that the auxiliary blades 69 are of such length as to just contact the free ends of the ribs 25, and the end portions of said blades 69 are re-enforced against backward flexing by the end portions 71 of the plates 73. As the blades 69 pass through the arc which is substantially coincidental with the member 20, the ends of said blades will tend to remove any paraffine which may build up beyond the heighth of the ribs.

Should there be an accumulation of gravel in the pockets 26, the blade 69 will tend to dislodge same, and should there be any pieces of gravel which extend beyond the ends of the ribs 25 and offer resistance to the movement of the rotor, the end portions of the blade 69 and the thin end portions 71 of the plates 73 will flex rearwardly to pass over such pieces of gravel.

The blades 52 may be designed for a predetermined pressure. For example, the curvature of the free ends of said blades 52 may be such as to hold a predetermined pressure of say forty pounds. Should the pressure of the well rise above said predetermined pressure, the free ends of the blades may be forced forwardly to permit the oil to blow by said blades. If greater pressure resistance is required, the thickness of the blades may be increased and/or the metallic sheet 65 inserted between the blade portions 63 and 64.

It is also to be noted that due to the flexibility of the blades 52, sand may readily pass through the device.

I claim:

1. A flow meter, comprising: a body having a generally cylindrical chamber with an inlet, and an outlet spaced annularly therefrom; a shaft axially arranged in said cylindrical chamber, said shaft having means for operating a device for recording the rotation thereof; a rotor mounted on said shaft, said rotor comprising a plurality of radially extending annularly spaced flexible blades having a greater length than the radius of the chamber and having their outer ends engaging the cylindrical wall of said chamber; supporting structure for each of said blades, said supporting structure for each blade comprising a plate extending substantially radially of the shaft and disposed on the leading side of said blade, said plate being of less length than the radius of said chamber; a second plate having a part substantially parallel to the plate and spaced rearwardly thereof relative to the direction of rotation of the rotor a greater amount than the thickness of the blade; spacer members received in openings provided therefor in the portion of the blade disposed between the plates, said spacer members extending substantially from one plate to the other; means for securing said spacer members in position and an arcuate member disposed in the chamber between the inlet and outlet on one side of the shaft to provide a restriction for causing fluid flow from the inlet to the outlet on the other side of the shaft.

2. A flow meter, comprising: a body having a generally cylindrical chamber with an inlet, and an outlet spaced annularly therefrom; a shaft axially arranged in said cylindrical chamber, said shaft having means for operating a device for recording the rotation thereof; a rotor mounted on said shaft, said rotor comprising a plurality of radially extending annularly spaced flexible blades having a greater length than the radius of the chamber and having their outer ends engaging the cylindrical wall of said chamber; supporting structure for each of said blades, said supporting structure for each blade comprising a plate extending substantially radially of the shaft and disposed on the leading side of said blade, said plate being of less length than the radius of said chamber; a second plate having a part substantially parallel to the plate and spaced rearwardly thereof relative to the direction of rotation of the rotor a greater amount than the thickness of the blade, said second plate having an outer end portion curved oppositely of the direction of rotation of the rotor in spaced relationship to the cylindrical wall of the chamber and on which the outer end portion of the blade is supported when said blade is bent backward during rotation of the rotor; spacer members received in openings provided therefor in the portion of the blade disposed between the plates, said spacer members extending substantially from one plate to the other; means for securing said spacer members in position, and an arcuate member disposed in the chamber between the inlet and outlet on one side of the shaft to provide a restriction for causing fluid flow from the inlet to the outlet on the other side of the shaft.

3. A flow meter, comprising: a body having a generally cylindrical chamber with an inlet, and an outlet spaced annularly therefrom; a shaft axially arranged in said cylindrical chamber, said shaft having means for operating a device for recording the rotation thereof; a rotor mounted on said shaft, said rotor comprising a plurality of radially extending annularly spaced flexible blades having a greater length than the radius of the chamber and having their outer ends engaging the cylindrical wall of said chamber; supporting structure for each of said blades, said supporting structure for each blade comprising a plate extending substantially radially of the shaft and disposed on the leading side of said blade, said plate being of less length than the radius of said chamber; a second plate having a part substantially parallel to the plate and spaced rearwardly thereof relative to the direction of rotation of the rotor a greater amount than the thickness of the blade, said second plate having an outer end portion curved oppositely of the direction of rotation of the rotor in spaced relationship to the cylindrical wall of the chamber and being provided with a plurality of openings therethrough; spacer members received in openings provided therefor in the portion of the blade disposed between the plates, said spacer members extending substantially from one plate to the other; and means for securing said spacer members in position.

4. A flow meter, comprising: a body having a generally cylindrical chamber with an inlet, and an outlet spaced annularly therefrom; a shaft axially arranged in said cylindrical chamber, said shaft having means for operating a device for recording the rotation thereof; a rotor mounted on said shaft, said rotor comprising a plurality of radially extending annularly spaced flexible blades having a greater length than the radius of the chamber and having their outer ends engaging the cylindrical wall of said chamber; supporting structure for each of said blades, said supporting structure for each blade comprising a plate extending substantially radially of the shaft, and disposed on the leading side of said blade, said plate being of less length than the radius of said chamber; a second plate having a part substantially parallel to the plate and spaced rearwardly thereof relative to the direction of rotation of the rotor a greater amount than the thickness of the blade; spacer members received in openings provided therefor in the portion of the blade disposed between the plates, said spacer members extending substantially from one plate to the other; means for securing said spacer members in position; an arcuate member disposed in the chamber between the inlet and outlet on one side of the shaft to provide a restriction for causing fluid flow from the inlet to the outlet from the other side of the shaft; and transversely extending ribs on said arcuate member, said ribs being arcuately spaced apart and adapted to engage the free ends of the blades and to fold said blades rearwardly and scrape the outer surfaces thereof as the rotor is rotated.

5. In a flow meter: a body having a generally cylindrical chamber with an inlet, and an outlet spaced annularly therefrom; a shaft axially arranged in said cylindrical chamber; a rotor mounted on said shaft and adapted to rotate same, said rotor comprising a hub received on said shaft and of less length than the axial length of said chamber; a plurality of flexible blades spaced annularly relative to said hub, said blades having cut-away portions for reception of the hub so that the inner end portions of said blades engage the surface of the shaft at each end of said hub; a plate for the leading side of each blade, said plate having a notch for reception of the hub so that the inner end portions of said plate contact the surface of the shaft at the ends of said hub, said plate being secured to the hub; a second plate, for the trailing side of each blade, said second plate including a portion substantially parallel with the first mentioned plate and spaced therefrom, and a portion turned rearwardly relative to the direction of rotation of the rotor and having a plurality of openings therein; the parallel side of said second plate having a notch adapted to receive said hub so that the inner end portions of said second plate contact the shaft at the ends of the hub, said second plate being secured to the hub; the free end of the first mentioned plate and the turned portion of the second mentioned plate being spaced from the wall of the cylindrical chamber; spacers between the parallel portions of said plates received in openings provided therefor in the blades; screw means securing said spacers in position, the parallel portions of said plates being spaced apart a greater distance than the thickness of the blades; and an arcuate member disposed in the chamber between the inlet and outlet on one side of the shaft to provide a restriction for causing fluid flow from the inlet to the outlet on the other side of the shaft.

6. The invention defined by claim 5, wherein there are cover plates closing the ends of the cylindrical chamber and the side edges of the plates are spaced from the inner sides of said cover plates, the side edges of the blades being in sliding engagement with said cover plates.

7. In a flow meter: a body having a generally cylindrical chamber with an inlet, and an outlet spaced annularly therefrom; a rotor mounted within said chamber, said rotor comprising a plurality of substantially radially extending annularly spaced flexible blades of greater length than the radius of the chamber and having free end portions curved oppositely of the direction of rotation of the rotor, said rotor having means for connecting same, means for indicating the rotation thereof; means for supporting said blades; an arcuate member secured within the chamber and providing a restriction on one side of the rotor; a plurality of auxiliary blades disposed between the first mentioned blades in annularly spaced relationship, the outer ends of said auxiliary blades being adapted to contact at least portions of the inner surface of the arcuate member; and means for supporting the auxiliary blades.

8. In a flow meter: a body having a generally cylindrical chamber with an inlet, and an outlet spaced annularly therefrom; a rotor mounted within said chamber, said rotor comprising a plurality of substantially radially extending annularly spaced flexible blades of greater length than the radius of the chamber and having free end portions curved oppositely of the direction of rotation of the rotor; means for indicating the rotation of said rotor; means connecting the rotor and said indicating means; means for supporting said blades; an arcuate member secured within the chamber and providing a restriction on one side of the rotor; a plurality of auxiliary blades disposed between the first mentioned blades in annularly spaced relationship, the outer ends of said auxiliary blades being adapted to contact at least portions of the inner surface of the arcuate member; and means for supporting the auxiliary blades.

9. In a flow meter: a body having a generally cylindrical chamber with an inlet, and an outlet spaced annularly therefrom; an arcuate member disposed in the chamber between the inlet and outlet and at one side of said chamber; a rotor within said chamber, said rotor comprising a plurality of substantially radially extending annularly spaced flexible blades of greater length than the radius of the chamber and having free end portions adapted to curve oppositely of the direction of rotation of the rotor, the free outer ends of said blades being engageable with the cylindrical wall of the chamber; a rigid plate for each blade at the forward side thereof for limiting flexing in the forward direction; and a rigid plate member at the back side of each blade, said plate member including a portion substantially parallel with the first mentioned plate to back up the blade and also including a portion curved oppositely of the direction of rotation of the rotor in spaced relation to the cylindrical wall of the chamber, said curved portion providing support means for the back of the flexible blade when said blade is folded back by the arcuate member as the rotor is rotated.

10. In a rotor for a flow meter: a shaft; a plurality of generally radially extending flexible blades spaced apart annularly with respect to the shaft; and rigid supporting members at each side of each flexible blade and supporting a substantial inner portion of the blade, a substantial portion of each blade being free to flex, the supporting member at the rear of each blade having a rearwardly turned part of sufficient length to back up the free end of the blade when the latter is folded over said back turned portion.

11. In a flow meter: a body having a generally cylindrical chamber with an inlet, and an outlet spaced annularly therefrom; an arcuate member disposed in the chamber between the inlet and outlet and at one side of said chamber; a shaft arranged substantially axially of said chamber; a plurality of flexible, generally radially extending blades spaced apart annularly with respect to the chamber and having their free outer ends engageable with the cylindrical wall of said chamber; and rigid supporting members at each side of each flexible blade and supporting a substantial inner portion thereof, a substantial outer end portion of each blade being free to flex, the supporting members at the rear of said blades having rearwardly turned parts of sufficient length to back up the free end portions of the blades when the latter are turned over said rearwardly-turned portions.

12. In a flow meter: a body having a generally cylindrical chamber with an inlet, and an outlet spaced annularly therefrom; an arcuate member disposed in the chamber between the inlet and outlet and at one side of said chamber; a shaft arranged substantially axially of said chamber; a plurality of flexible, generally radially extending blades spaced apart annularly with respect to the chamber and having their free outer ends engageable with the cylindrical wall of said chamber; and rigid supporting members at each side of each flexible blade and supporting a substantial inner portion thereof, a substantial outer end portion of each blade being free to flex, the supporting members at the rear of said blades having rearwardly turned parts of sufficient length to back up the free end portions of the blades when the latter are turned over said rearwardly-turned portions, said blades being capable of holding a predetermined inlet pressure on their back side, a pressure above said predetermined pressure causing the free end portions of said blades to yield and be forced forwardly so as to allow flow past said blades.

ELMER D. SMYSER.

References Cited in the file of this patent

UNITED STATES PATENTS

| Number | Name | Date |
|---|---|---|
| 20,842 | Darker | July 6, 1858 |
| 268,522 | Müller | Dec. 5, 1882 |
| 941,582 | Mill | Nov. 30, 1909 |
| 1,053,321 | Schrock | Feb. 18, 1913 |
| 1,639,043 | Malouf | Aug. 16, 1927 |
| 1,953,029 | Smith | Mar. 27, 1934 |
| 2,393,204 | Taylor | Jan. 15, 1946 |

FOREIGN PATENTS

| Number | Country | Date |
|---|---|---|
| 353,370 | France | June 27, 1905 |